US006657963B1

(12) United States Patent
Paquette et al.

(10) Patent No.: US 6,657,963 B1
(45) Date of Patent: Dec. 2, 2003

(54) METHOD AND APPARATUS FOR CONTROLLING DATA CONGESTION IN A FRAME RELAY/ATM INTERNETWORKING SYSTEM

(75) Inventors: Andre' Paquette, Kanata (CA);
Anthony J. Dilliott, Stittsville (CA);
Alexander S. Bruce, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/364,158

(22) Filed: Jul. 30, 1999

(51) Int. Cl.[7] .............................................. G08C 15/00
(52) U.S. Cl. ................................... 370/236; 370/395.1
(58) Field of Search .............................. 370/236, 236.1, 370/229, 466, 468, 395.1, 395.63

(56) References Cited

U.S. PATENT DOCUMENTS

| | | | | |
|---|---|---|---|---|
| 6,064,648 A | * | 5/2000 | Hellman et al. | ............ 370/230 |
| 6,118,759 A | * | 9/2000 | Ohyoshi et al. | ............ 370/236 |
| 6,178,159 B1 | * | 1/2001 | He et al. | ................. 370/236.1 |
| 6,373,844 B1 | * | 4/2002 | Saito | ....................... 370/236.1 |

OTHER PUBLICATIONS

Walton, Dean, Frame Relay to ATM interworking, Jan. 1998, BT Technol Journal, Vol 16 No 1, pp 96–105.*
O'Leary, Doug, Frame Relay/ATM PVC Service Interworking Implementation Agreement, Apr. 14, 1995, The Frame Relay Forum, Document No. FRF.8.*
O'Leary, Doug, Frame Relay/ATM PVC Network Interworking Implementation Agreement, Dec. 20, 1994, The Frame Relay Forum, Document No. FRF.5.*

* cited by examiner

Primary Examiner—Chau Nguyen
Assistant Examiner—Keith M. George

(57) ABSTRACT

A method and apparatus for controlling data congestion in a frame relay/ATM internetworking system is presented. In one embodiment, received frame relay frames are monitored in an internetworking switch to detect an indication, of congestion. When an indication of congestion is detected, the egress traffic provided to the source of the congestion indication is reduced, which may lead to local congestion in the internetworking switch. When congestion within the internetworking switch has arisen and a resource management cell is received along an ATM ingress path, an ATM, backward resource management cell is generated having a set congestion indication bit that informs additional ATM nodes of the congestion. In another embodiment, ATM cells are received in an internetworking switch and monitored to detect an indication of congestion. When an indication of congestion is detected, egress traffic is reduced to the source of the indication, and when local congestion results in the internetworking switch as a result, a subsequent frame relay frame is generated that includes a backward explicit congestion notification (BECN) indication. The set BECN indication informs additional frame relay portions of the network of the congestion indication relayed by the ATM cells.

36 Claims, 5 Drawing Sheets

METHOD AND APPARATUS FOR CONTROLLING DATA CONGESTION IN A FRAME RELAY/ATM INTERNETWORKING SYSTEM

FIELD OF THE INVENTION

This invention relates generally to communication systems and more particularly to internetworking within such communication systems.

BACKGROUND OF THE INVENTION

Communication networks are known to include a plurality of switches that transport user data (e.g. voice, text, video, etc.) between calling parties and called parties. The user data can be transported using any one of a plurality of standardized data transport protocols. Such transport protocols include frame relay, asynchronous transfer mode (ATM), internet protocol (IP), etc. In addition, the switches transport system data that contains information regarding the connections currently being supported. For example, the system data may include congestion information, frame information, packet information, etc.

As is further known, congestion information relayed in communication networks is used to inform switches upstream and downstream that a switch or port is congested, which indicates that the congested switch or port is overloaded and may be causing undesirable delays. When an end-point source switch, or port, receives the congestion information, the port attempts to reduce its transmission rate to the congested node, thus allowing the congested switch to reduce or contain the overload condition. The congestion information is network service dependent, or data transport protocol dependent. In ATM systems, congestion can be indicated between sources and destinations (which include virtual source/virtual destination blocks) through the use of resource management (RM) and backward resource management (BRM) cells that carry congestion indications. The typical means for communicating congestion states in frame relay systems is through the use of the forward and backward explicit congestion notification bits (FECN and BECN, respectively) in data layer frames, or through the use of a consolidated link layer management (CLLM) congestion indication in a management layer frame.

When the communication network includes both frame relay and ATM switches (i.e. frame relay and ATM internetworking), protocol dependent congestion information is typically only understood and processed by switches of like protocol and passed as data traffic by switches of dissimilar protocols. For example, if a prior art ATM switch is upstream from a congested frame relay node, the prior art ATM switch would typically not recognize congestion information from the frame relay switch and would continue to provide data to the frame relay switch as before, possibly compounding the congested condition.

In some systems, a limited amount of congestion information is communicated between portions of the network utilizing differing protocols. However, the mapping of congestion information that occurs between ATM and frame relay protocols are inadequate in terms of their ability to aid in the control of congestion in the network.

Therefore, a need exists for a more effective method and apparatus for controlling data congestion in frame relay/ATM internetworking systems that allows for better communication of congestion states between switches of different protocols.

DETAILED DESCRIPTION OF A PREFERRED EMBODIMENT

Generally, the present invention provides a method and apparatus for controlling data congestion in a frame relay/ATM internetworking system on a per connection basis. In one embodiment, received frame relay frames are monitored in an internetworking switch to detect an indication of congestion. When an indication of congestion is detected, the egress traffic provided to the source of the congestion indication is reduced, which may lead to local congestion in the internetworking switch. When congestion within the internetworking switch has arisen and a resource management cell is received along an ATM ingress path, an ATM backward resource management cell is generated having a set congestion indication bit that informs additional ATM nodes of the congestion. In another embodiment, ATM cells are received in an internetworking switch and monitored to detect an indication of congestion. When an indication of congestion is detected, egress traffic is reduced to the source of the indication, and when local congestion results in the internetworking switch as a result, a subsequent frame relay frame is generated that includes a backward explicit congestion-notification (BECN) indication. The set BECN indication informs additional frame relay portions of the network of the congestion indication relayed by the ATM cells.

With such a method and apparatus; congestion information can be relayed between switches using different protocols within the network. This allows upstream switches to detect downstream congestion and reduce the rate at which frames are transferred from their ingress ports to their egress ports that are providing data to the area that is congested. As such, any ingress buffering capabilities of upstream switches are used to offload the data flow toward the downstream congestion. In the case where the congestion reaches a level that forces cells or frames to be discarded, the upstream propagation of the congestion information progressively moves any discard point closer to the traffic sources in the network. This ensures that network bandwidth is not wasted transferring frames through the network to the original site of congestion where they may be discarded.

Figure 1:
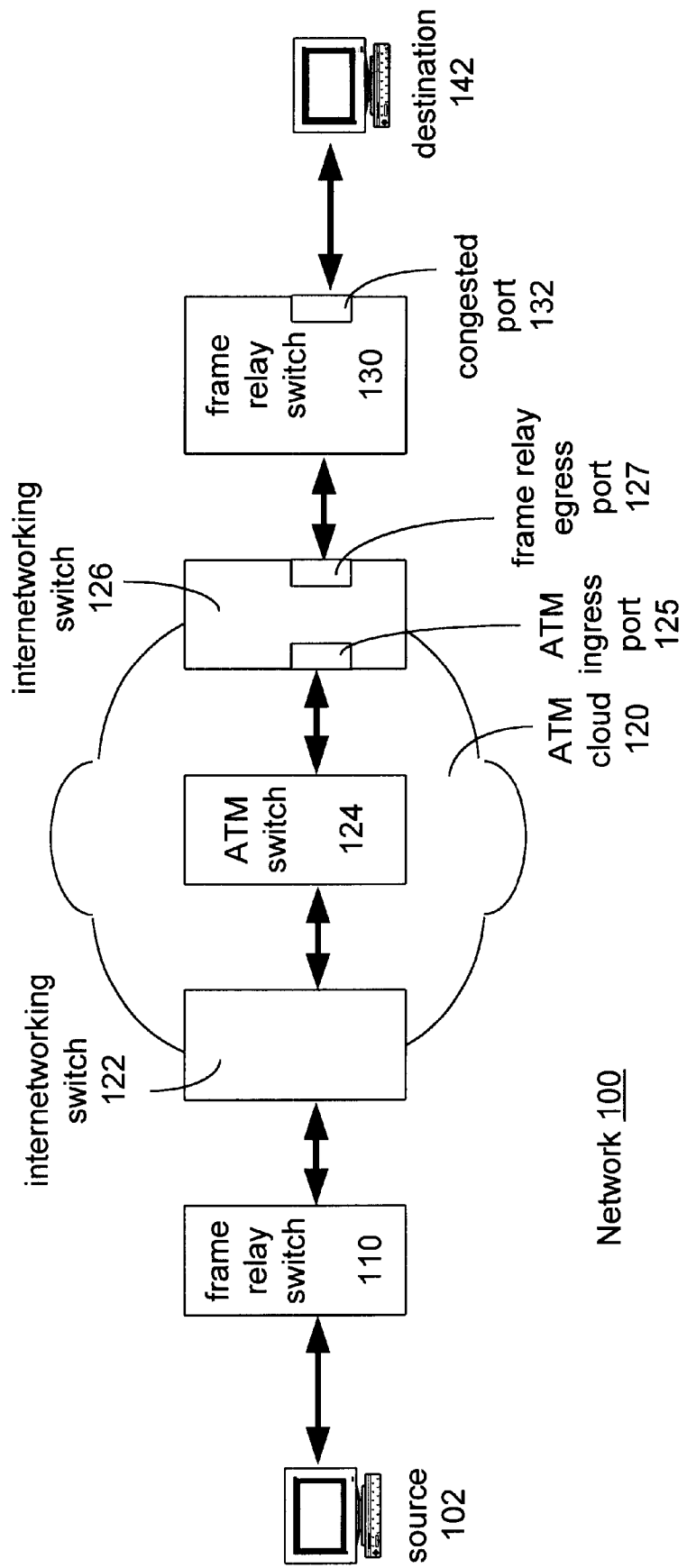
FIG. 1 illustrates a block diagram of a communication network in accordance with the present invention.

The present invention can be more fully described with reference to FIGS. 1–6. FIG. 1 illustrates a network that includes a source 102, a destination 142, frame relay switches 110 and 130, internetworking switches 122 and 126, and ATM switch 124. The source 102 generates data to be transmitted to the destination 142. The data stream from the source is carried through the frame relay switch 110, the ATM cloud 120, and the frame relay switch 130 to the destination 142. Along this path, the data is carried using both ATM and frame relay protocols.

If congestion occurs at the congested port 132 of the frame relay switch 130, the frame relay switch will generate a BECN indication that is sent upstream to the internetworking switch 126. The congestion may be the result of failed equipment, a sudden burst of traffic, etc. The BECN indication is intended to inform upstream neighbors of the frame relay switch 130 that the switch is overloaded, and additional delays may be incurred by data passing through the switch. If the congestion reaches a point where frames received by the switch 130 can no longer be buffered, some frames may have to be discarded, resulting in undesirable data loss. As such, it is desirable to reduce the inflow of ingress data for the switch 130 until the congestion has been reduced or eliminated.

In prior art systems, the internetworking switch 126 would divide up frames received from the frame relay switch 130 to produce ATM cells that would be relayed across the ATM cloud and reassembled into frame relay frames by the internetworking switch 122. In such prior art systems, the BECN indication from the frame relay switch 130 would be included in the ATM cells generated by the internetworking switch. The BECN indication would be encapsulated within the ATM cells and would be overlooked and ignored by switches in the ATM cloud 120. As such, prior art ATM switches do not functionally recognize or act upon the BECN congestion indication in such a way as to aid in reduction of downstream congestion. As such, in these prior art systems the ATM switches in the cloud 120 would continue to provide data to the congested frame relay switch 130 as before, and any buffering capabilities of the ATM switches in terms of offloading the switch 130 would be forfeited. When the frames are reassembled by the internetworking switch 122, the BECN indication would be passed to the frame relay switch 110, but, as can be seen, the frame relay switch 110 is not in the optimal position to assist in offloading the congestion at the frame relay switch 130.

The present invention overcomes the limitations of such prior art solutions by translating congestion indications from one protocol format to another protocol format. In the example system of FIG. 1, the internetworking switch 126, upon receiving a frame with a set BECN indication from the frame relay switch 130, notes that there is congestion downstream. As such, it will attempt to reduce traffic on the connection to the congested switch 130. Preferably, this is accomplished within the internetworking switch 126 by informing the ATM ingress port 125 of the switch 126 that there is congestion downstream from the egress port 127 coupled to switch 130. This can be accomplished through the use of virtual source/virtual destination (VS/VD) instances within the ingress and egress ports 125 and 127. The operation of the VS/VD blocks will be discussed in more detail with respect to FIG. 2. When a forward resource management (FRM) cell is received by the egress port 127 from the ingress port 125 or another source within the network, a congestion indication bit that is set will be included in the backwards resource management (BRM) cell produced in the egress port 127 in response to the FRM cell. This notifies the ingress ATM port 125 or other source of the congestion detected by the egress frame relay port. The FRM and BRM cells that are utilized in ATM available bit rate (ABR) connections are well known in the art. Resource management (RM) cells are often referred to as forward resource management (FRM) cells when they are moving away from their point of origination, whereas RM cells returning to their point of origination are referred to as backward resource management (BRM cells). Through the specification, FRM cells are commonly referred to simply as RM cells, whereas BRM cells are understood to be conveying resource management information upstream to a source, or point of origination.

In addition to reducing its egress transmission rate in the frame relay egress port 127, the internetworking switch 126 will clear the BECN indication received from the frame relay switch 130 prior to encapsulating the frame relay frames in ATM cells. Because the interhetworking switch 126 has taken notice of the downstream congestion indicated by the BECN bit, there is no need to propagate the congestion indication back to the frame relay switch 110. In some cases, the reduction in egress traffic on the frame relay egress port 127 may be enough to relieve the congestion at the congested port 132, and, as such, propagation of the BECN congestion indication could be counterproductive.

The resulting reduction in egress traffic from the internetworking switch 126 will likely result in the buffers within the switch 126 becoming increasingly full. When this results in a congested state within the switch 126, it will use the congestion indication means available in the ATM protocol to inform the ATM switch 124 that it is congested. Thus, the buffers in successive upstream switches (both ATM and frame relay) will be utilized to offload the congestion. The congested state and congestion notification will trickle upstream, as each switch is able to notify neighboring switches of the congestion, regardless of any protocol differences. The upstream switches may adjust their transmission rates to help the original congested port or switch to recover, and can also reduce any potential data discarding that may have resulted.

Figure 2:
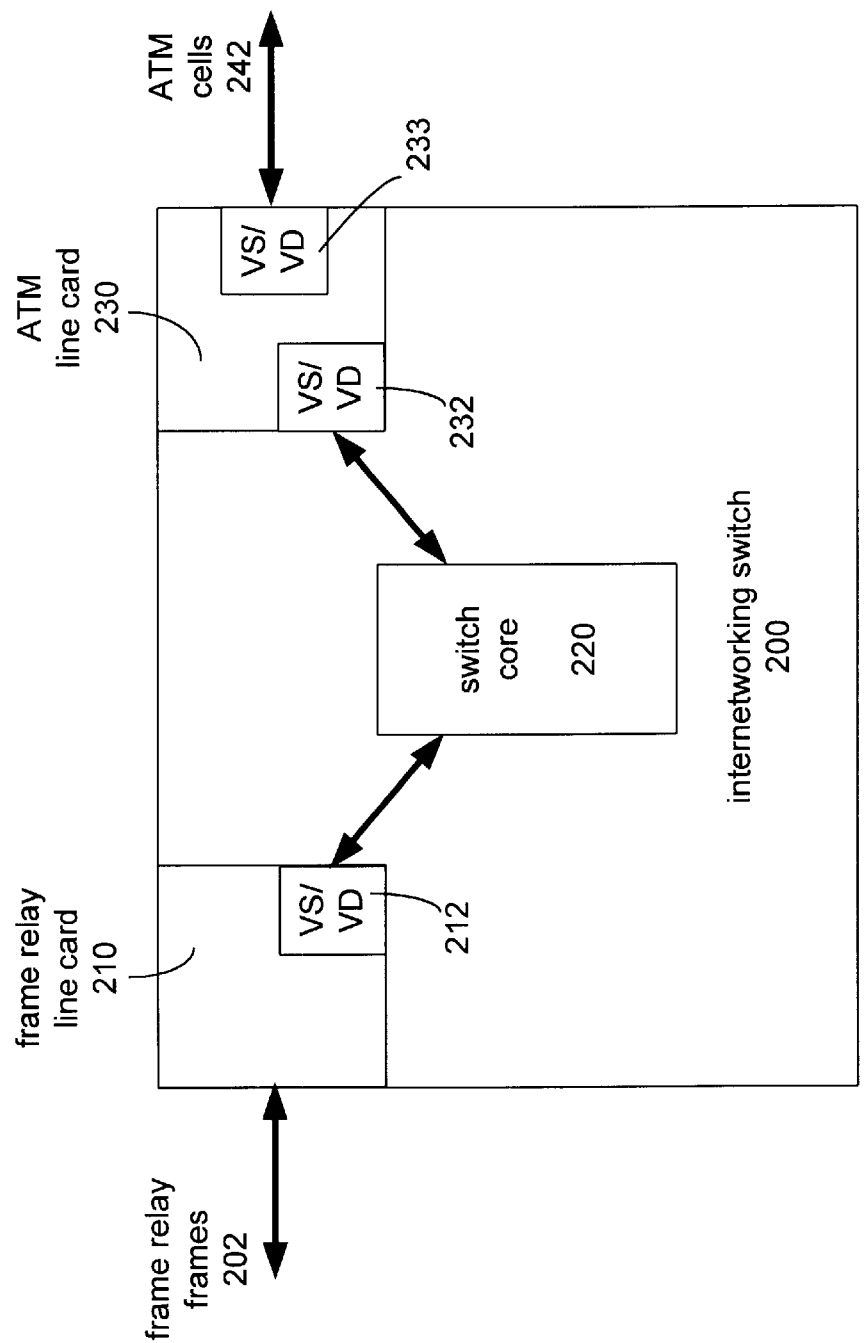
FIG. 2 illustrates a block diagram of an internetworking switch in accordance with the present invention

FIG. 2 illustrates a block diagram of an internetworking switch 200 that includes a switch core 220, at least one frame relay port or line card 210, and at least one ATM port or line card 230. The frame relay line card 210 receives and transmits frame relay frames and the ATM line card 230 receives and transmits ATM cells. In prior art systems, received frame relay frames would be received by the line card 210 and converted to ATM cells in a manner that encapsulated any congestion information. In addition, the congestion information was generally ignored by the ATM portions of the switch such that no effective attempt to reduce the congestion was undertaken by the ATM portions of the switch. Similarly, in prior art systems, any ATM congestion information that was present in received ATM cells was treated with a minimal level of acknowledgment by frame relay portions of the switch such that an adequate response that had the potential to reduce congestion did not occur.

The present invention ensures that any congestion information in either protocol is recognized by both the ATM and frame relay portions of the switch 200 and the entire network within which the switch 200 is included. One or more VSNVD blocks 212, 232, and 233 are included within each of the frame relay line card 210 and the ATM line card 230. Together with the switch core 220, VS/VDs 212 and 232 form a loop that relays data traffic between the ATM and frame relay ingress and egress ports. As such, if congestion is detected at an egress port, the congestion can be indicated across the switch to the corresponding ingress port, which can begin reducing its data transmission rate to the egress port that detects the congestion. If the congestion is detected on a frame relay egress port and the ingress port is ATM, the congestion information is converted from frame relay format to ATM format such that it is recognized and understood by the ingress port and not merely relayed further upstream. In addition to this potential means for buffering data in the ingress portion of the switch, the switch core 220 may include some rate control capabilities, such as the ATM explicit rate (ER) control that could be used to manipulate data flow through the switch in response to the downstream congestion. The specific means for signaling congestion will be discussed in additional detail below.

Figure 3:
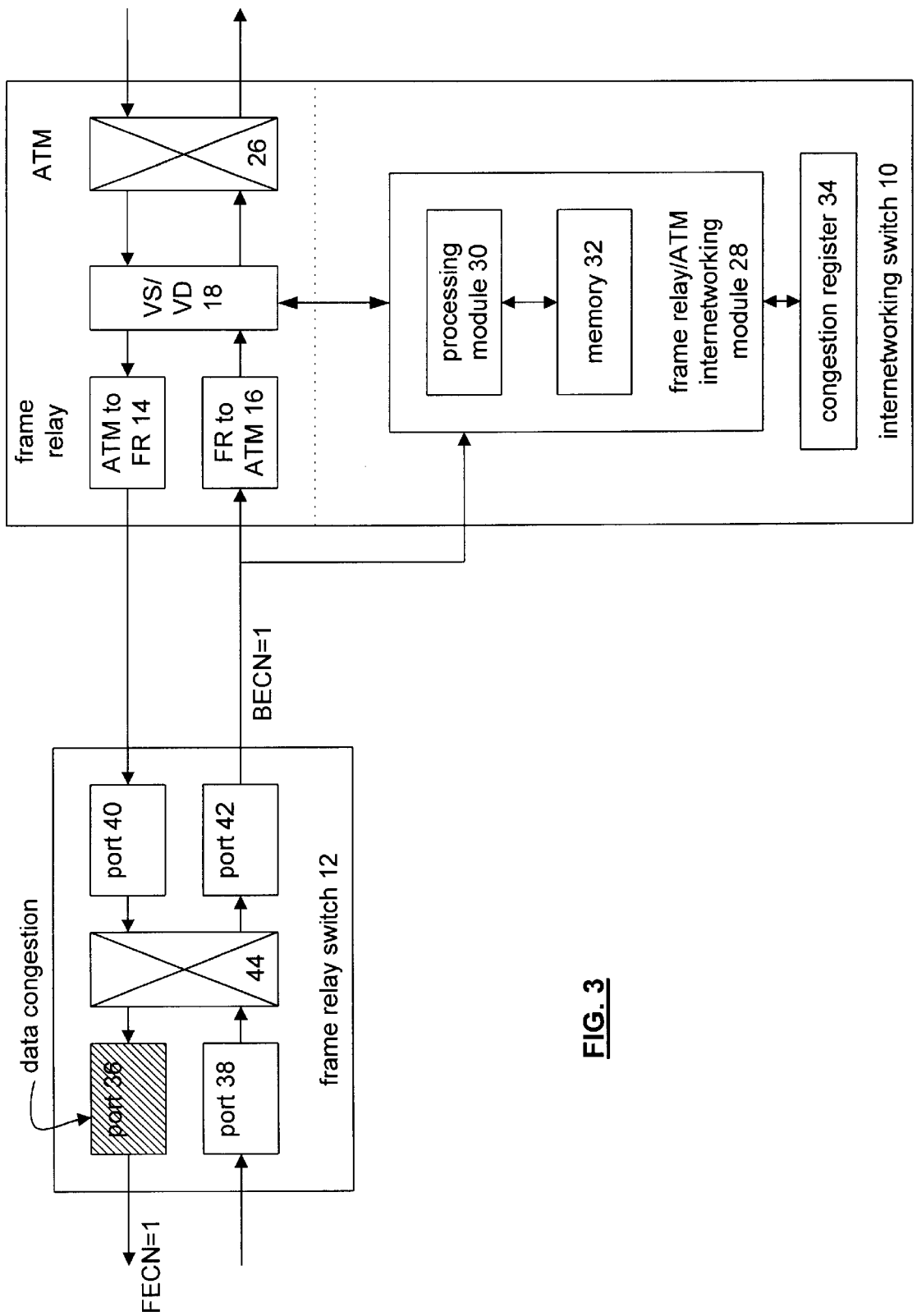
FIG. 3 illustrates a block diagram of a portion of a communication network in accordance with the present invention.

FIG. 3 illustrates a block diagram of an internetworking switch 10 operably coupled to a frame relay switch 12. The frame relay switch 12 includes egress ports 36 and 42, ingress ports 38 and 40, and a cross coupling switch 44. The internetworking switch 10, which may be a MainStreetXpress 36170 as manufactured by Newbridge Networks Corporation of Ottawa, Canada, functions to convert ATM transport data into frame relay transport data, and vice versa. As such, the internetworking switch 10 has a frame relay section and an ATM section. Preferably, the switch 10 includes both ATM and frame relay line cards that provide both ATM and frame relay ingress and egress ports. As shown, the egress port 36 of the frame relay switch 12 is overloaded, resulting in data congestion. As such, in the downstream path, a forward explicit congestion notification (FECN) bit is set. Correspondingly, in the upstream path of the congested port, the BECN bit is set. As such, the internetworking switch 10 receives the set BECN bit via the ingress path of the frame relay portion. The internetworking switch 10 includes one or more virtual source/virtual destination modules 18 and a cross coupling switch 26. The virtual source/virtual destination 18 includes circuitry to process congestion information as currently implemented within the Newbridge 36170 switch.

The congestion processing circuitry of the internetworking switch 10 that enables one or more VSNVD blocks to adjust ATM data transmission rates in response to congestion of may be implemented at one or more of three levels, which include binary, relative, and explicit rate (ER) marking. ATM available bit rate (ABR) connections include a feedback mechanism that allows downstream entities to communicate data rate information back to upstream sources. With binary marking, the Explicit Forward Congestion Indication (EFCI) bit of the ATM cell header is used to communicate congestion within the network. With relative marking, the CI and NI bits within the resource management cells are used to communication congestion. With ER marking, an explicit rate is carried within the resource management cells. This rate is used to tell the virtual source at what rate (in cells/second) it can transmit. Alternatively, the ER value may be "marked down" when congestion occurs on an egress frame relay port. Marking down the rate may be accomplished by measuring the actual rate at which a particular connection is transmitting, converting this value from frames/second to cells/second, and using this value to mark down the explicit rate.

The frame relay portion of the internetworking switch 10 includes an ATM-to-frame relay converter 14 and a frame relay-to-ATM converter 16. In addition, the internetworking switch 10 includes a frame relay/ATM internetworking module 28 that includes a processing module 30 and memory 32. The processing module 28 may be a single processing device or a plurality of processing devices. Such a processing device may be a microprocessor, microcomputer, central processing unit, digital signal processor, state machine, logic circuitry, application specific integrated circuit (ASIC), existing processing devices within the internetworking switch, and/or any device that manipulates digital information based on operational instructions. The memory 32 may; be a single memory device or a plurality of memory devices. Such a memory device may be a random access memory, floppy disk memory, system memory, existing memory within the internetworking switch 10, hard drive, magnetic tape memory, and or any device that stores digital information. Note that when the processing module 28 implements one or more of its function using a state machine or logic circuitry, the memory containing the corresponding operational instructions is embedded in the circuitry comprising the state machine or logic circuitry.

The frame relay/ATM internetworking module 28 is operably coupled to a congestion register 34, which may be a flag used to-stores an indication that congestion has been detected. In operation, on a per-connection basis, the frame relay/ATM internetworking module 28 monitors the ingress path of switch 10 that receives frames from the frame relay switch 12. When the BECN bit is set in a received frame, the internetworking module 28 may store a portion or indication of the congestion information in the congestion register 34. Subsequently, when a backward resource management cell (BRM cell) is generated for virtual source virtual destination 18, the internetworking module 28 generates a BRM cell with the CI bit 36 set. At this point, the internetworking module 28 clears the stored indication in the congestion register 34.

By providing the virtual source/virtual destination 18 with a BRM cell with a congestion indication that it can understand, the virtual source virtual destination 18 can buffer incoming calls and accordingly reduce its data transport rate to frame relay switch 12. As such, upstream switches can detect downstream congestion and reduce the rate at which frames are transferred from the ingress port to the egress port. This allows the ingress capacity of upstream nodes (e.g. switches) to be used to buffer data and offload downstream congestion. It also moves any potential discard point upstream toward the source of data in the network, which prevents network bandwidth from being used to transfer frames to the last egress port where they may be discarded.

Figure 4:
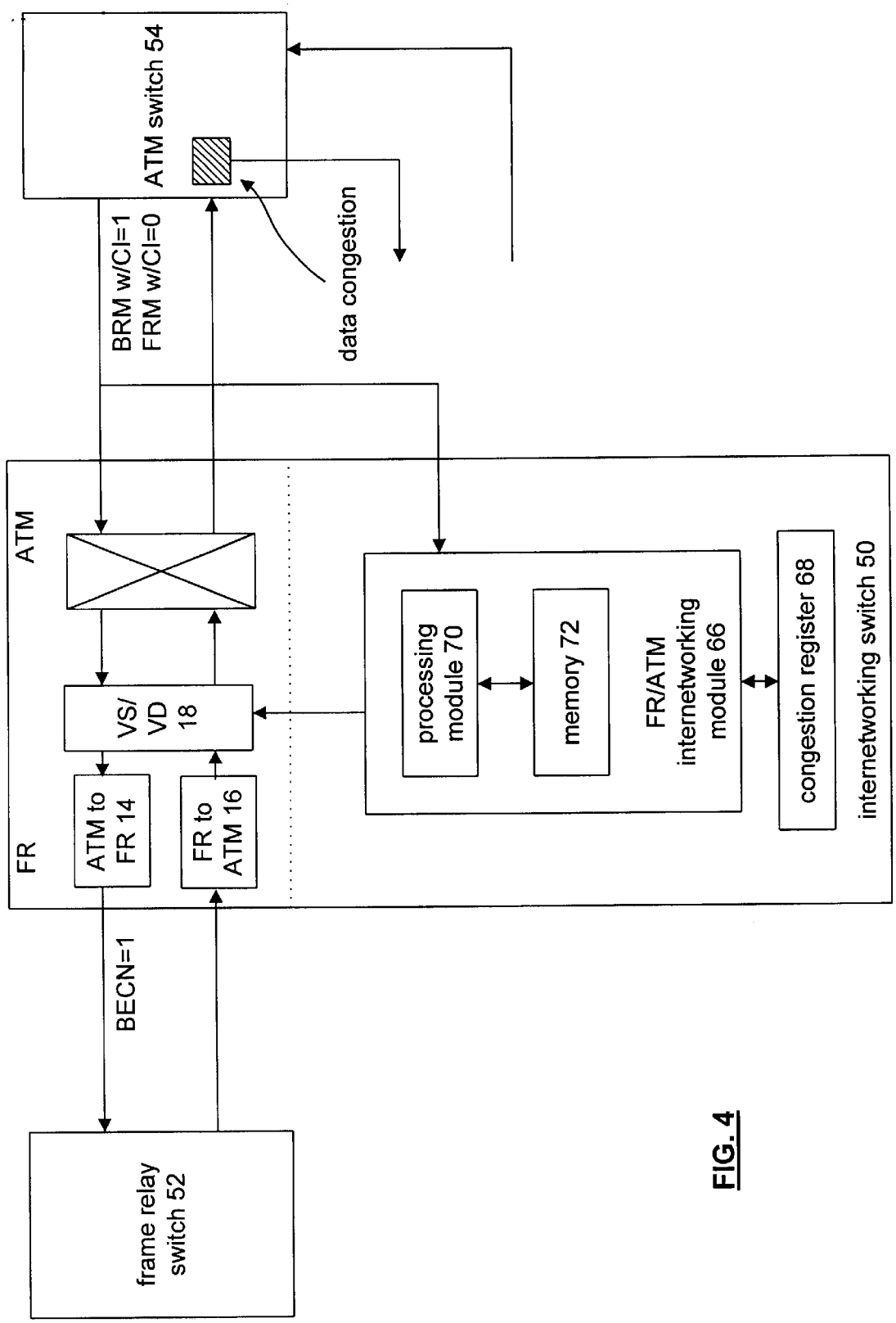
FIG. 4 illustrates a block diagram of an alternate portion of a communication network in accordance with the present invention.

FIG. 4 illustrates a frame relay switch 52 operably coupled to an internetworking switch 50 that is in turn operably coupled to an ATM switch 54. The ATM switch 54 has an egress port with data congestion. Assuming that the switch 54 has a VS/VD function operating on one or both of its ingress/egress ports, when the switch 54 receives an RM cell from the internetworking switch 50, it will return a backward resource management cell (BRM) having an ATM format congestion indication such that the internetworking switch 50 is notified of the congested condition.

The internetworking switch 50 includes an ATM portion and a frame relay portion. This configuration of the internetworking switch 50 may include similar functionality as the internetworking switch 10 of FIG. 3, including the virtual source/virtual destination 18. The internetworking switch 50 also includes a frame relay/ATM internetworking module 66 that includes processing module 70 and memory 72. The processing module 70 may be similar to processing module 30 and memory 72 may be similar to memory 32. The internetworking module 66 is operably coupled to a congestion register 68 that may be used to store an indication of congestion.

In this configuration, the internetworking module 66 is operably coupled to monitor the ATM data stream from the ATM switch 54 to the internetworking switch 50. The data path is monitored to determine whether a BRM cell that includes an ATM format congestion indication is transmitted. In one embodiment, when such a BRM cell is detected, the internetworking module 66 may store a congestion indication in the congestion register 68. When a data layer frame or a management layer frame is generated for transmission to a frame relay portion of the switch and an ATM format congestion indication has been detected, the internetworking module 66 generates a frame relay format congestion indication. This frame relay format congestion indication may include setting the BECN bit in the data layer frame or including a consolidated link layer management (CLLM) indication in the management layer frame. The CLLM indication is an explicit notification that a particular connection is experiencing congestion. The BECN or CLLM indications may be provided to the virtual source virtual destination 18. Upon receiving the set frame relay congestion indications, the virtual source virtual destination 18 buffers incoming frame relay frames and correspondingly reduces its egress data transfer rate to the ATM switch 54. As such, the upstream ingress data rate of the ATM switch 54 is reduced, thereby helping reduce the data congestion at the egress port of ATM switch 54.

In another embodiment, when the BRM cell is detected that indicates congestion in the downstream ATM portion of the network, the internetworking module 66 may begin to reduce its egress transmission rate along the path directed to the ATM portion experiencing congestion. The module 66 may then refrain from passing any congestion information upstream until it becomes congested itself due to the reduction in egress traffic.

Figure 5:
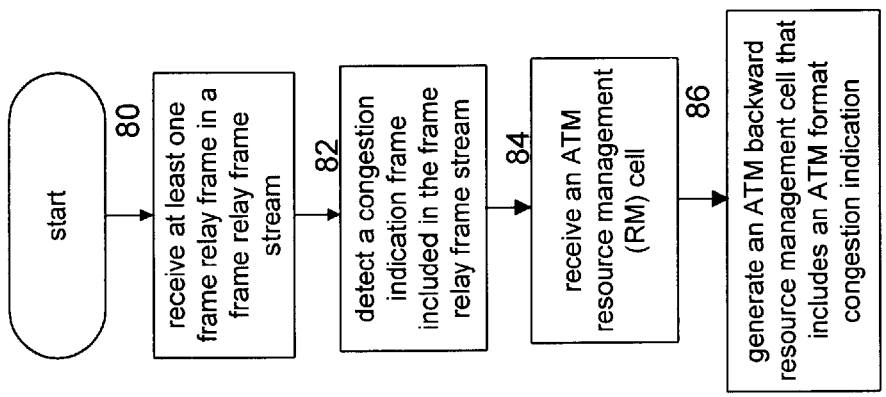
FIG. 5 illustrates a logic diagram of a method for controlling data congestion in accordance with the present convention.

FIG. 5 illustrates a flow diagram of a method that may be implemented, on a per-connection basis, by the internetworking module 28 of FIG. 3 or another internetworking module such that frame relay congestion can be communicated to ATM portions of a switch or network. The process begins at step 80 where at least one frame relay frame in a frame relay frame stream is received. The frame relay frames are data layer frames and/or management layer frames as defined by the frame relay protocol; The process then proceeds to step 82 where a congestion indication frame is detected, in the frame relay frame stream. The congestion indication frame is a frame relay frame that includes a frame relay format indication of congestion. Preferably, the detection is accomplished by monitoring a BECN bit included in each frame relay data layer frame. Once a congestion indication in the form of a BECN bit is detected, the BECN bit is cleared prior to encapsulation of the frame relay frame that includes the BECN bit such that the congestion indication is not propagated to the frame relay switch that will receive the frame relay frame after it is reconstructed further upstream. Congestion may also be indicated via a management layer frame that includes a CLLM congestion indication. The module performing the method of FIG. 5 may reduce a transmission rate corresponding to an egress path directed toward the source of the congestion indication frame as a result of receiving the congestion indication. This reduction in egress traffic may cause the module to become congested itself. When this occurs, the system may choose to store an indication of receipt of the congestion indication frame. When a subsequently received ATM RM cell is received at step 84, the BRM cell generated at step 86 in response to the RM cell is configured to include an ATM format congestion indication such that it relays the notification of the congestion provided by the received frame relay frames. This may take the form of simply setting a congestion indication bit, or it may involve attempting to alter the data transmission rate over the ATM ABR link as described earlier. If a stored indication of receipt of the congestion indication frame is utilized, the stored indication can be checked each time a RM cell is received and cleared each time a congestion indication is relayed via a BRM cell. Knowledge of the downstream congestion enables upstream switches to buffer some of the data traffic such that the congestion can be mitigated and may also prevent loss of data due to discards in congested elements.

In some cases, the VS/VD functionality may not exist or may not be enabled in each port within a switch. In such cases, reducing egress data traffic along the path towards the congested node may not be performed within the switch when downstream congestion is detected. When this occurs, the congestion indication is simply relayed upstream to the next source (or virtual source) which reduces its egress transmission rate.

Figure 6:
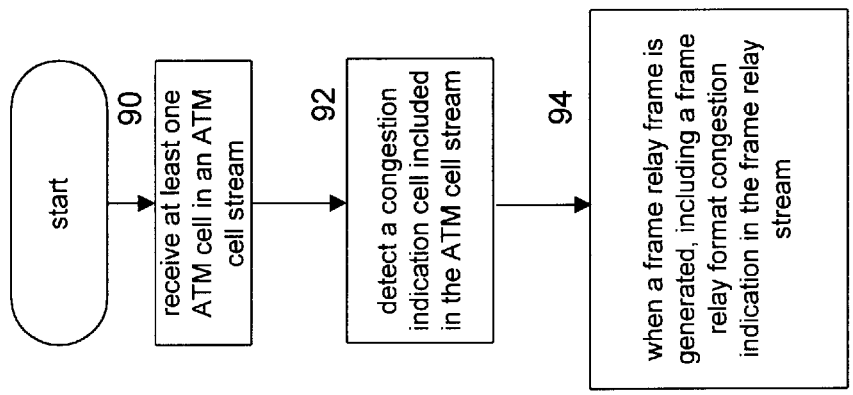
FIG. 6 illustrates a logic diagram of an alternate method for controlling data congestion in accordance with the present convention.

FIG. 6 illustrates a flow diagram of a method for controlling data congestion that may be performed, on a per-connection basis, by the internetworking module 66 of FIG. 4 or by another internetworking module. Such a method allows congestion information provided by an ATM portion of the system to be relayed and understood by a frame relay portion of the system. The process begins at step 90 where at least one ATM cell is received in an ATM cell stream. Preferably, the ATM cell stream includes data cells and backward resource management cells. The process then proceeds to step 92 where a congestion indication cell is detected in the ATM cell stream. The congestion indication cell is an ATM cell that includes an ATM format indication of congestion. The ATM format indication of congestion may be an explicit rate value that indicates congestion or it may be a congestion indication bit in the BRM cell that is set.

As a result of receiving the congestion indication cell, the module performing the method of FIG. 6 may reduce a transmission rate corresponding to an egress path directed toward a source of the congestion indication cell. This can cause the module itself to become congested as ingress data directed towards the egress path consumes any buffering capabilities of the module. Once this congestion occurs, the module will propagate the congestion indication to an-upstream source. In other embodiments, the internal buffering performed by the module may not be possible. In such cases, the congestion indication is relayed upstream when it is detected, as it illustrated in step 94 below.

At step 94, when a frame relay frame is generated, a frame relay format congestion indication is included in the frame relay frame. The frame relay frame may be a data frame that includes a set BECN bit or may be a management layer frame with a CLLM congestion indication. When the congestion cell is detected, an indication of the receipt of the congestion indication cell may be stored. This indication can be checked each time a frame is generated to determine if it is appropriate to include a frame relay format congestion indication in the frame. The indication is cleared each time the congestion is indicated through the inclusion of a congestion indication in a frame.

The congestion indication provided to the frame relay portion allows for upstream buffering and a reduction in data rates along the datapath such that the congestion being experienced in the ATM portion has less detrimental consequences.

The proceeding discussion has presented a method and apparatus for controlling data congestion in a frame relay/ATM internetworking systems. By including such functionality, upstream nodes (e.g., switches) can detect downstream congestion and reduce the rate at which frames are transferred from their egress ports to their egress ports. This allows the upstream nodes to be used to offload some of the downstream congestion. As one of average skill in the art will appreciate, other embodiments may be readily derived from the teachings of the present invention without deviating from the spirit or scope of the claimed invention.

What is claimed is:

1. A method for controlling data congestion in a frame relay-ATM internetworking system, the method comprising:
   receiving at least one frame relay frame in a frame relay frame stream;
   detecting a congestion indication frame included in the frame relay frame stream, wherein the congestion indication frame is a frame relay frame that includes a frame relay format indication of congestion;
   receiving an ATM resource management cell; and
   when the congestion indication frame has been detected and the ATM resource management cell has been received, generating an ATM backward resource management cell that includes an ATM format congestion indication.

2. The method of claim 1, wherein the ATM format congestion indication includes an explicit rate value.

3. The method of claim 1, wherein the ATM format congestion indication is a congestion indication bit included in the backward resource management cell.

4. The method of claim 1, wherein the at least one frame relay frame is included in at least one of a data layer and a management layer.

5. The method of claim 4, wherein, when the at least one frame relay frame is in the data layer, the frame relay format indication of congestion comprises a Backward Explicit Congestion Notification (BECN).

6. The method of claim 4, wherein when the at least one frame relay frame is in the management layer, the frame relay format indication of congestion comprises a Consolidated Link Layer Management (CLLM) congestion message.

7. The method of claim 1 further comprises:
   when the congestion indication frame is detected, storing an indication of receipt of the congestion indication frame, wherein the indication of receipt is checked when the ATM resource management cell is received to determine if the backward resource management cell that includes an ATM format congestion indication should be generated in response to the ATM resource management cell; and
   clearing the indication of receipt when the backward resource management cell that includes an ATM format congestion indication is generated.

8. The method of claim 1 further comprises:
   when the congestion indication frame is detected, reducing a transmission rate corresponding to an egress path directed toward a source of the congestion indication frame.

9. The method of claim 8, wherein generating the ATM backward resource management cell that includes the ATM format congestion indication is further conditioned upon determining that a congestion state has propagated as a result of reducing the transmission rate corresponding to the egress path.

10. A method for controlling data congestion in a frame relay-ATM internetworking system, the method comprising:
    receiving at least one ATM cell in an ATM cell stream;
    detecting a congestion indication cell included in the ATM cell stream, wherein the congestion indication cell is an ATM cell that includes an ATM format indication of congestion; and
    when the congestion indication cell has been detected and a frame relay frame is generated, including a backward frame relay format congestion indication in the frame relay frame.

11. The method of claim 10, wherein the ATM cell stream includes data cells and Backward Resource Management (BRM) cells.

12. The method of claim 11, wherein when the congestion indication cell is a BRM cell, the ATM format indication of congestion is comprised within a congestion indication bit.

13. The method of claim 11, wherein the ATM format indication of congestion is an explicit rate value that indicates congestion.

14. The method of claim 10, wherein including the frame relay format congestion indication in the frame relay frame further comprises setting a Backward Explicit Congestion Notification (BECN) bit in a data layer frame relay frame.

15. The method of claim 10, wherein including the frame relay frame congestion indication in the frame relay frame further comprises including Consolidated Link Layer Management (CLLM) congestion message in a management layer frame relay frame.

16. The method of claim 10 further comprises:
    when the congestion indication cell is detected, reducing a transmission rate corresponding to an egress path directed toward a source of the congestion indication cell.

17. The method of claim 16, wherein including the frame relay format congestion indication in the frame relay frame is further conditioned upon determining that a congestion state has propagated as a result of reducing the transmission rate corresponding to the egress path.

18. A method for controlling data congestion in a frame relay-ATM internetworking system, the method comprising:
    receiving at least one ATM cell in an ATM cell stream;
    detecting a congestion indication cell included in the ATM cell stream, wherein the congestion indication cell is an ATM cell that includes an ATM format indication of congestion;
    when the congestion indication cell has been detected, storing an indication of the receipt of the congestion indication cell, wherein the indication of receipt is checked when the frame relay frame is generated to determine if the frame relay frame format congestion indication should be included in the frame relay frame;
    when the congestion indication cell has been detected and a frame relay frame is generated, including a frame relay format congestion indication in the frame relay frame; and
    clearing the indication of the receipt when the frame relay format configuration indication is included in the frame relay frame.

19. A frame relay-ATM internetworking module comprises:
    a processing module; and
    memory coupled to the processing module, wherein the memory stores operational instructions, wherein when executed by the processing module, the operation instructions cause the processing module to perform the functions of:
    detecting a congestion indication frame included in a received frame relay frame stream that includes at least one frame relay frame, wherein the congestion indication frame is a frame relay frame that includes a frame relay format indication of congestion; and when the congestion indication frame has been detected and an ATM resource management cell has been received, generating an ATM backward resource management cell that includes an ATM format congestion indication.

20. The module of claim 19, wherein the ATM format congestion indication includes an explicit rate value.

21. The module of claim 19, wherein the ATM format congestion indication includes a congestion indication bit that is set in the backward resource management cell.

22. The module of claim 19, wherein the at least one frame relay frame is included in at least one of a data layer and a management layer.

23. The module of claim 22, wherein, when the at least one frame relay frame is in the data layer, the frame relay format indication of congestion comprises a Backward Explicit Congestion Notification (BECN).

24. The module of claim 22, wherein when the at least one frame relay frame is in the management layer, the frame relay format indication of congestion comprises a Consolidated Link Layer Management (CLLM) congestion message.

25. The module of claim 19, wherein the memory stores additional instructions such that when executed by the processing module, the additional instruction cause the processing module to perform the additional functions of:

when the congestion indication frame is detected, storing an indication of receipt of the congestion indication frame, wherein the indication of receipt is checked when the ATM resource management cell is received to determine if the backward resource management cell that includes an ATM format congestion indication should be generated in response to the ATM resource management cell; and clearing the indication of receipt when the backward resource management cell that includes an ATM format congestion indication is generated.

26. The module of claim 19, wherein the memory stores additional instructions such that when executed by the processing module, the additional instruction cause the processing module to perform the additional function of:

when the congestion indication frame is detected, reducing a transmission rate corresponding to an egress path directed toward a source of the congestion indication frame.

27. A frame relay-ATM internetworking module comprises:

a processing module; and memory operably coupled to the processing module, wherein the memory stores operational instructions, wherein when executed by the processing module, the operational instructions cause the processing module to perform the functions of:

detecting a congestion indication cell included in a received ATM cell stream that includes at least one ATM cell, wherein the congestion indication cell is an ATM cell that includes an ATM format indication of congestion; and when the congestion indication cell has been detected and a frame relay frame is generated, including a backward frame relay format congestion indication in the frame relay frame.

28. The module of claim 27, wherein the ATM cell stream includes data cells and Backward Resource Management (BRM) cells.

29. The module of claim 28, wherein the ATM format indication of congestion is an explicit rate value that indicates congestion.

30. The module of claim 28, wherein when the congestion indication cell is a BRM cell, the ATM format indication of congestion is comprised within a congestion indication bit.

31. The module of claim 27, wherein the memory stores additional instructions such that when executed by the processing module, the additional instruction cause the processing module to perform the additional function of including the frame relay format congestion indication in the frame relay frame by setting a Backward Explicit Congestion Notification (BECN) bit in a data layer frame relay frame.

32. The module of claim 27, wherein the memory stores additional instructions such that when executed by the processing module, the additional instruction cause the processing module to perform the additional function of including the frame relay frame congestion indication in the frame relay frame by including Consolidated Link Layer Management (CLLM) congestion message in a management layer frame relay frame.

33. The module of claim 27, wherein the memory stores additional instructions such that when executed by the processing module, the additional instruction cause the processing module to perform the additional function of:

when the congestion indication is detected, reducing a transmission rate corresponding to an egress path directed toward a source of the congestion indication cell.

34. A frame relay-ATM internetworking module comprises:

a processing module; and memory operably coupled to the processing module, wherein the memory stores operational instructions, wherein when executed by the processing module, the operational instructions cause the processing module to perform the functions of:

detecting a congestion indication cell included in a received ATM cell stream that includes at least one ATM cell, wherein the congestion indication cell is an ATM cell that includes an ATM format indication of congestion;

when the congestion indication cell has been detected, storing an indication of the receipt of the congestion indication cell, wherein the indication of receipt is checked when the frame relay frame is generated to determine if the frame relay format congestion indication should be included in the frame relay frame;

when the congestion indication cell has been detected and a frame relay frame is generated, including a frame relay format congestion indication in the frame relay frame; and clearing the indication of the receipt when the frame relay format congestion indication is included in the frame relay frame.

35. A method for controlling data congestion in a frame relay-ATM internetworking system, the method comprising:

receiving at least one frame relay frame in a frame relay frame stream;

detecting a congestion indication frame included in the frame relay frame stream, wherein the congestion indication frame is a frame relay frame that includes a frame relay format indication of congestion;

when the congestion indication frame is detected, reducing a transmission rate corresponding to an egress path directed toward a source of the congestion indication frame;

determining that reducing the transmission rate corresponding to the egress path has induced local congestion;

receiving an ATM resource management cell; and when the congestion indication frame has been detected and the ATM resource management cell has been received, generating an ATM backward resource management cell that includes an ATM format congestion indication.

36. A method for controlling data congestion in a frame relay-ATM internetworking system, the method comprising:

receiving at least one ATM cell in an ATM cell stream;

detecting a congestion indication cell included in the ATM cell stream, wherein the congestion indication cell is an ATM cell that includes an ATM format indication of congestion;

when the congestion indication cell is detected, reducing a transmission rate corresponding to an egress path directed toward a source of the congestion indication cell;

determining that reducing the transmission rate corresponding to the egress path has resulted in local congestion; and when local congestion exists and a frame relay frame is generated, including a frame relay format congestion indication in the frame relay frame.

* * * * *